July 2, 1957
G. B. SIMONSON
2,797,490
ADJUSTABLE INSIDE DIAMETER CHECKING
DEVICE WITH LOCKING MECHANISM
Filed Nov. 25, 1955
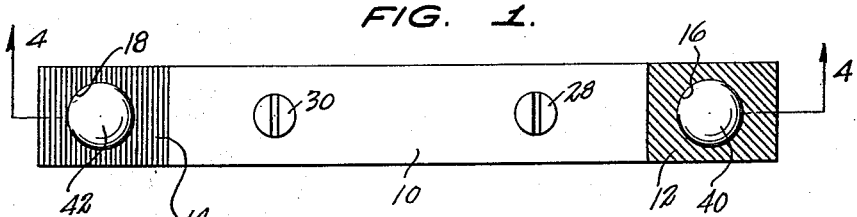
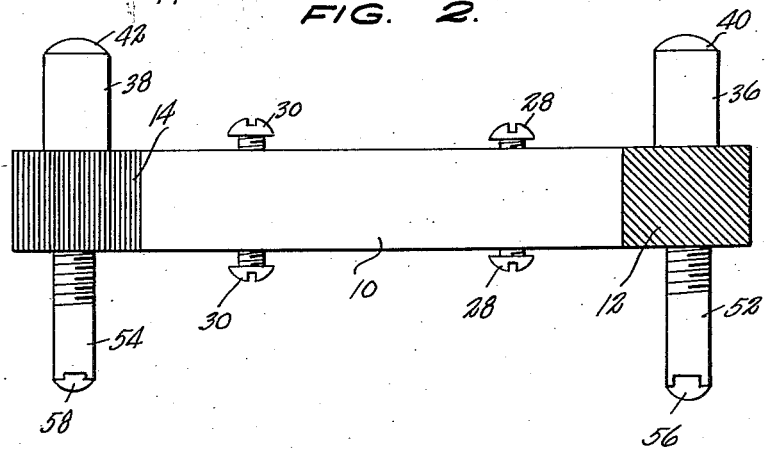
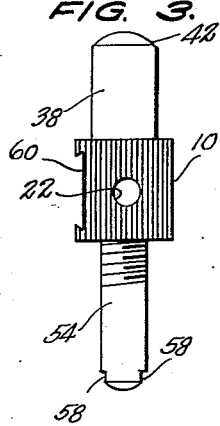
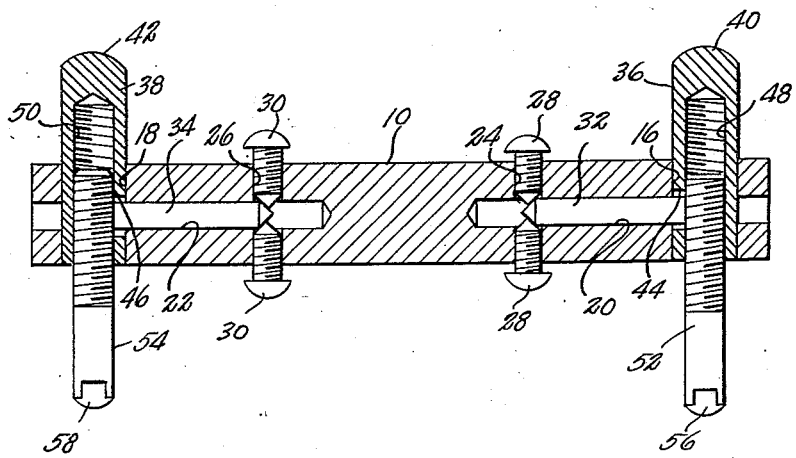
INVENTOR.
GEORGE B. SIMONSON,
BY
McMorrow, Berman & Davidson
ATTORNEYS.

United States Patent Office 2,797,490
Patented July 2, 1957

2,797,490

ADJUSTABLE INSIDE DIAMETER CHECKING DEVICE WITH LOCKING MECHANISM

George B. Simonson, Manhattan Beach, Calif.

Application November 25, 1955, Serial No. 548,908

1 Claim. (Cl. 33—163)

The present invention relates to devices designed for extension into cylindrical bores for use in checking the diameters thereof. More particularly, the invention has reference to that type used for determining whether a bore is within prescribed minimum and maximum tolerance limits.

Heretofore, the conventional method of checking the diameters of precision cylindrical bores has involved the use of cylinder or plug gauges, dial indicator gauges, gauges involving the flow of air between a cylinder and the inside surface of a bore, permanent segment gauges, etc.

All of these previous devices have certain notable deficiencies, in that their designs in some instances have been excessively complicated, have prevented use of the devices with maximum speed and facility, or have permitted manufacture only at excessive cost considering the benefits to be obtained from the use thereof.

The main object of the present invention is to provide a generally improved device for determining whether a particular cylindrical bore, machined, cast, or otherwise formed, is within minimum and maximum tolerance limits, which device can be manufactured at relatively low cost, will be simply designed rugged, and yet highly accurate when used.

Another object of importance is to provide a checking device as stated which can be usable for the measurement of bore diameters within a wide range of said diameters.

A further object of importance is to provide a checking device as stated which will be particularly marked, at opposite ends thereof, to enable a quick visual determination to be made as to which end is to be used for checking maximum tolerance and which for checking minimum tolerance.

Another object of importance is to provide a device having an improved locking mechanism for the checking means thereof, which locking mechanism can be swiftly adjusted to insure against accidental extension or retraction of said checking means.

Another object is to provide a locking mechanism as described which will be particularly simple in design and yet wholly efficient when in use.

Still another object is to provide a device as stated in which the checking means used for determining maximum and minimum tolerances can be identically formed, thus to reduce measurably the cost of manufacture of the checking device.

Still another object is to provide a checking device as stated which will be characterized particularly by its exceptionally low cost, light weight, ease of use, wide range of practical application, compactness, and capability of close tolerance bore checking.

Other objects will appear from the following description, the claims appended thereto, and from the annexed drawing, in which like references characters designate like parts throughout the several views, and wherein:

Figure 1 is a top plan view of a checking device formed according to the present invention;

Figure 2 is a side elevational view thereof;

Figure 3 is an end elevational view of the device as seen from the left of Figure 2; and Figure 4 is a longitudinal sectional view substantially on line 4—4 of Figure 1.

The checking device constituting the present invention includes an elongated handle 10 which in the present instance is of rectangular cross section, and is unchanging in cross sectional area from end to end thereof. However, it is not critical to the invention that the handle be of this particular cross section and that it be of unchanging cross sectional area, and in other forms, the handle can be shaped as desired so far as its length, cross sectional configuration, and cross sectional area are concerned.

The elongated, straight handle 10, at opposite ends thereof, is, in a preferred embodiment, provided with visual indications as to which end of the handle is to be inserted in a cylindrical bore when a minimum tolerance is being checked, and which is to be inserted when a maximum tolerance is being checked. To this end, in the present instance one end portion of the handle is externally colored as at 12 with the color green, and at its other end with the color red, as at 14. The green end is for checking minimum tolerance, while the red end is for checking maximum tolerance. These colors are chosen in view of the fact that the minimum tolerance check involves a "go" (green) application, while the maximum tolerance check is a "no go" (red) application.

Formed in the opposite end portions of the handle 10 adjacent the respective extremities thereof, and opening upon the respective colored surfaces of the handle are transverse, smooth-walled openings 16, 18. The openings 16, 18 intersect with and extend normally to the longitudinal center line of the handle, and intermediate their ends, the respective openings are in communication with elongated longitudinal bores 20, 22 respectively, each of which opens at its outer end upon the adjacent end surface of the handle, and has a closed inner end terminating short of the midlength point of the handle. The bores 20, 22 are also smooth-walled, and intersect adjacent their outer, open ends with the smooth-walled, circular bores 16, 18.

Intersecting in perpendicular relation with the bores 20, 22 adjacent the closed inner ends of said bores are threaded, transverse bores 24, 26 respectively paralleling the smooth-walled openings 16, 18, but formed to diameters substantially less than those of the smooth-walled openings. The transverse bores 24, 26 open upon opposite surfaces of the handle, and threaded into the opposite ends of said transvers bores are locking screws 28, 30. A pair of locking screws is used in each of the transverse, threaded bores, the heads of the screws of said pair projecting out of the respective ends of the bores, and the screws being threaded inwardly toward one another and being formed at their inner ends with conical tips projecting into the longitudinal bores 20, 22.

Slidable within the bores 20, 22 are elongated, cylindrical locking pins 32, 34 respectively, having conically tipped inner ends cammingly engaged by the associated locking screws, thus to permit the pins to be biased longitudinally of the associated longitudinal bores responsive to threading of the associated screws inwardly toward one another. At their outer ends, the pins are formed with flat end surfaces normal to the lengths of the pins.

Fitting snugly in openings 16, 18, are rods 36, 38, projecting radially, outwardly of the handle 10, and formed at their outer ends with rounded, part-spherical surfaces 40, 42 adapted to engage against the surface of the bore, not shown, that is being checked. The rods, where they intersect with the longitudinal bores have side apertures 44, 46 preferably somewhat greater in diameter than the diameters of the longitudinal bores, and receiving the blunt outer ends of the locking pins 32, 34. The apertures communicate with axial, threaded sockets 48, 50 formed in the respective rods, said sockets at their inner ends terminating a substantial distance inwardly from the rounded outer ends of the rods. The sockets receive elongated screws 52, 54, the outer ends of which project out of the sockets laterally of the handle in a direction opposite to that in which the projecting portions of the rods are extended. The projecting, outer ends of the screws are formed with diametrically opposed flats 56, 58 respectively to facilitate rotation of the screws.

The rod 36 and screw 52 are used for minimum tolerance checking, and hence are carried by the green-colored end portion of the handle, while the rod 38 and screw 54 are used for maximum tolerance checking.

In use of the device, the screw 52 is threaded inwardly or outwardly of socket 48 to whatever extent is desired to bring the overall length of the minimum tolerance checking member constituting rod 36 and screw 52 to the minimum tolerance of the bore being checked. Similarly, screw 54 is adjusted relative to rod 38 to cause the maximum tolerance checking member constituted by rod 38 and screw 54 to have an overall length equal to the maximum tolerance of the bore to be checked. Then, screws 28, 30 are threaded inwardly within their associated transverse bores, setting up a camming action against the conically tipped inner ends of the pins 32, 34, as a result of which the pins are forced against the screws 52, 54, so as to lock said screws in the selected position to which they were adjusted.

The device is now ready for use, and assuming that minimum tolerance is being checked, the green end of the handle is inserted in the bore than is to be checked, after which the handle is rocked about a transverse axis or fulcrum, which fulcrum can, for example, be the rounded outer end of screw 52. If the bore is within prescribed minimum tolerance limits, that is, is not below minimum tolerance, the rounded outer end of rod 36 will not, during the rocking of the handle, bind against the wall of the bore.

Then, the tool is reversed end for end, to check maximum tolerance, with the red end of the tool being inserted. This is a "no go" application, and accordingly, when the handle is rocked in the manner previously described, the rounded end of the rod 38 is to bind against the wall of the bore, indicating that the diameter of the bore is less than the maximum set.

Preferably, but not necessarily, one side of the handle is formed with a dove-tail groove 60 into which may be inserted a tag or plate, not shown, which may be inscribed, or stamped to identify the device as to hole tolerance limits, part name and or number the devices to check, and/or any other information considered important by the user.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

A device for checking a bore diameter as to its compliance with maximum and minimum tolerance limits, comprising: an elongated handle having transverse openings adjacent its opposite ends and having longitudinal bores communicating with the respective openings; rods engaged in said openings and projecting out of at least one end of the openings, said rods having axial, threaded recesses; screws threaded in the respective recesses and projecting out of the other end of the openings to cooperate with the rods in providing maximum and minimum tolerance checking members, said rods having side openings communicating the recesses with the respective bores adjacent one end of the bores; pins slidable longitudinally within the bores and extending through the side openings so as to bear at one end against the screws to lock the screws in selected positions to which they are threaded within the rods, whereby to hold said members at adjusted lengths following threading of the screws to selected positions within the rods, the pins when engaged in the side openings defining abutments restraining the members against removal from the transverse openings and said abutments being the sole obstruction preventing said removal of the members; and means carried by the handle for axially biasing the pins against the screws and for locking the pins against movement within the bores in a direction away from the screws, comprising a pair of diametrically opposed, conically tipped screws threadable radially of the handle into each bore inwardly from the other ends of the bores a distance sufficient for retraction of the pins axially thereof wholly out of the side openings of the rods responsive to backing of the second named screws fully out of the bores, whereby to free the members for removal from the transverse openings of the handle, the pins having conical tips cammingly engaged by the tips of the second named screws, for exerting pressure against the pins tending to shift the same in the direction of the first named screws responsive to said threading of the second named screws radially inwardly of the handle.

References Cited in the file of this patent

UNITED STATES PATENTS

| | | |
|---|---|---|
| 1,300,841 | Johansson | Apr. 15, 1919 |
| 2,227,883 | Grobe | Jan. 7, 1941 |
| 2,375,945 | Redmer | May 15, 1945 |